(12) United States Patent
Kimura et al.

(10) Patent No.: US 7,151,364 B2
(45) Date of Patent: Dec. 19, 2006

(54) DC/DC CONVERTER AND PROGRAM

(75) Inventors: Kouya Kimura, Asaka (JP); Yasuto Watanabe, Hidaka (JP); Mitsuaki Hirakawa, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 11/047,671

(22) Filed: Feb. 2, 2005

(65) Prior Publication Data

US 2005/0174097 A1 Aug. 11, 2005

(30) Foreign Application Priority Data

Feb. 6, 2004 (JP) ............................. 2004-031309

(51) Int. Cl.
*G05F 1/40* (2006.01)
(52) U.S. Cl. ..................................... 323/282
(58) Field of Classification Search ................ 323/282, 323/284, 351; 363/123, 131
See application file for complete search history.

(56) References Cited

U.S. PATENT DOCUMENTS

| 4,384,321 | A |   | 5/1983 | Rippel |  |
|---|---|---|---|---|---|
| 4,442,401 | A |   | 4/1984 | Jamieson |  |
| 5,923,542 | A | * | 7/1999 | Sasaki et al. | 363/16 |
| 6,084,790 | A |   | 7/2000 | Wong |  |
| 6,696,823 | B1 | * | 2/2004 | Ledenev et al. | 323/272 |
| 2001/0013767 | A1 |   | 8/2001 | Takemoto |  |

FOREIGN PATENT DOCUMENTS

| DE | 27 39 387 A1 | 3/1979 |
| EP | 0 632 571 A2 | 1/1995 |
| EP | 1 300 934 A1 | 4/2003 |
| JP | 1-248959 A | 10/1989 |
| JP | 8-308220 A | 11/1996 |
| JP | 10-155273 A | 6/1998 |
| JP | 11-146635 A | 5/1999 |
| JP | 2002-10632 A | 1/2002 |

* cited by examiner

*Primary Examiner*—Adolf Berhane
(74) *Attorney, Agent, or Firm*—Birch, Stewart, Kolasch & Birch, LLP

(57) ABSTRACT

A small and light weight DC/DC converter is provided comprising a coil in which a first coil and a second coil are wound in opposite directions (reversed phases) on the same core is used, and at the same time as when an excitation current is flowed in the first coil with a switch ON and a switch OFF, an electric current is generated in the second coil in a direction to offset the magnetization of the core, and the electric current from the second coil is transferred to an output side capacitor. Similarly, at the same time as an excitation current is flowed in the second coil with the switch ON and the switch OFF, an electric current is generated in the first coil in a direction to offset the magnetization of the core, and the electric current from the first coil is transferred to the output side capacitor.

5 Claims, 7 Drawing Sheets

DC/DC CONVERTER AND PROGRAM

BACKGROUND OF THE INVENTION

1. Field of the Invention

Priority is claimed to Japanese application No. 2004-31309, filed Feb. 6, 2004, which is incorporated herein by reference.

The present invention relates to a DC/DC converter, and in particular relates to a voltage step-up DC/DC converter that is further miniaturized and lightened, and a program.

2. Description of Related Art

Conventionally various types of voltage step-up DC/DC converters have been proposed. Many of the conventional voltage step-up DC/DC converters are provided with a basic construction as shown in FIG. 7, as shown, for example, in Japanese Patent Application, first Publication No. 2003-111390 and Japanese Patent Application, First Publication No. 2003-216255.

The voltage step-up DC/DC converter shown in FIG. 7 (also referred to simply as a "DC/DC converter") comprises; a capacitor Cin on an input side, a capacitor Cout on an output side, a coil (inductor) L, a switch SW1 with a transistor, and a diode D1.

In FIG. 7, when the switch SW1 is turned ON, electric current flows as: DC power supply (electric charge accumulated in the capacitor Cin)→coil L→switch SW1→GND. At this time, the coil L is subjected to direct current excitation, and magnetic energy is accumulated.

Next, when the switch SW1 is turned OFF, the induced voltage generated by the magnetic energy accumulated in the coil L is superimposed on the power supply voltage (the voltage of Cin), a voltage higher than the input voltage value from the power supply is output from the coil L, and an output electric current Ic is output via the diode D1.

Moreover, by changing an ON/OFF duty ratio of the switch SW1, a required output voltage can be obtained within a predetermined range. FIG. 8 is a timing chart showing time variance in output electric current Ic in the circuit of FIG. 7. It can be seen that a greater output electric current Ic is output during the OFF period of the switch SW1 than during the ON cycle.

This DC/DC converter circuit shown in FIG. 7 is a practicable voltage step-up circuit, and is conventionally well known.

However, since the above mentioned circuit shown in FIG. 7 is constructed such that the electric current from the power supply, simply direct-current-excites the coil L and energy is accumulated, the size of the coil L must be large in order to prevent magnetic saturation in the coil L when it is being direct-current-excited. Moreover, generally the price of the coil rises in accordance with its size. Hence, miniaturization and price reduction of an entire DC/DC converter circuit becomes difficult.

Therefore, a construction may be considered in which two coils (inductors) are provided, as with the circuit shown in FIG. 9, and electric current I1 from the first coil L1 and electric current I2 from the second coil L2 are alternately output to the output side by alternately turning ON and OFF switches SW1 and SW2, which are provided on the output side of each coil. FIG. 10 is a timing chart showing time variance in output electric current in a circuit of such a construction.

In FIG. 9 and FIG. 10, electric current flows in the coil L1 when the switch SW1 is turned ON, and when the SW1 is turned OFF, the magnetic energy accumulated in the coil L1 flows to the output side as electric current I1 via the diode D1. Correspondingly, electric current flows in the coil L2 when the switch SW2 is turned ON, and when the SW2 is turned OFF, the magnetic energy accumulated in the coil L2 flows to the output side as electric current I2 via the diode D2. Therefore, the electric current that flows to the output side is the Ic denoted in FIG. 10.

According to this construction, the electric current from the power supply is dispersed since the two coils are provided, and the peak electric current in each coil is decreased to below that shown for the construction of FIG. 7. However the switching frequency remains the same, and light weight material having low magnetic loss cannot be used for the core material. That is, since the circuit shown in FIG. 9 is a type in which magnetic energy is accumulated in the coils (inductors), the inductors have to be formed with cores of heavy material in order to accumulate sufficient magnetic energy without having magnetic saturation. This has been an obstruction to the miniaturization, lightening, and price reduction of the entire device.

Meanwhile, a technique in which a gap is formed in the core to purposely generate magnetic leakage to avoid magnetic saturation has been known conventionally. However, in this method, a highly advanced technique is required for the gap formation process (such as cutting the core), and control of the magnetic leakage when operating the circuit also requires a highly advanced technique. Moreover, in forming a gap, problems in respect of strength, cost and labor, and a decrease in rigidity of the core and the like occur.

SUMMARY OF THE INVENTION

In general, there is a strong demand for further miniaturization and lightening of DC/DC converters. The present invention takes into consideration the above problems, with an object of providing a smaller, lighter and inexpensive DC/DC converter, and a program.

The present invention has been made in order to achieve the above object.

A DC/DC converter of the present invention, is a DC/DC converter comprising a DC power supply input section, a coil section connected to a positive electrode side of the DC power supply input section, and an output section that outputs voltage stepped up by an output electric current from the coil section, wherein aid coil section comprises a core portion, and a first coil and a second coil wound thereupon so as to offset a magnetic field, a first switch that is connected to an output side of the first coil and to a negative electrode side of the DC power supply input section, and that controls electric power to the first coil; and a second switch that is connected to an output side of the second coil and to a negative electrode side of the DC power supply input section, and that controls electric power to the second coil.

Moreover, the DC/DC converter of the present invention further comprises a control section that controls the first switch and the second switch to alternately turn ON and OFF.

Furthermore, the first and second coils are wound in opposite directions approximately one to one.

According to such a construction, when the first switch (for example, the switch SW1 shown in FIG. 1) is turned ON and the second switch (for example, the switch SW2 in FIG. 1) is turned OFF, input power supply voltage is applied to the first coil (for example, the coil L1 in FIG. 1) and an exciting current flows. Also at this time, since the windings of the first coil and the second coil (for example, the coil L2 in FIG. 1) are electromagnetically coupled (function as a transformer) and the turns ratio of the windings is 1:1, the same voltage as the first coil is induced in the second coil. Moreover, due to the phase relationship of the windings, the potential of the output side of the second coil becomes higher than that of the input power supply, and the electric current of the second coil charges the capacitor on the output side (for example, Cout shown in FIG. 1).

In the same way, when the second switch is turned ON and the first switch is turned OFF, the input power supply voltage is applied to the second coil and an exciting current flows. Also at this time, since the windings of the first coil and the second coil are electromagnetically coupled (function as a transformer) and the turn ratio of the windings is 1:1, the same voltage as the second coil is induced in the first coil. Moreover, due to the phase of the windings, the potential of the output side of the first coil becomes higher than that of the input power supply, and the electric current of the first coil charges the capacitor on the output side.

In this way, when the first switch is turned ON and the second switch is turned OFF, at the same time as when an exciting current flows in the first coil, an electric current is also generated in the second coil in a direction to offset the magnetization of the core, and the electric current (magnetic energy) from the second coil is transferred to the output side. Moreover, when the second switch is turned ON and the first switch is turned OFF, at the same time as when an exciting current flows in the second coil, an electric current is also generated in the first coil in a direction to offset the magnetization of the core, and the electric current (magnetic energy) from the first coil is transferred to the output side.

As a result, since the directions of the electric current in the windings of the first coil and the second coil are opposite, direct current magnetization of the core (ferrite or the like) is offset, making it difficult for the core to become magnetically saturated, so that even with a core smaller than that for the conventional technology, a larger electric power can be handled. That is to say, miniaturization of the coil and the step-up DC/DC converter becomes realized.

Moreover, when each switch is driven, for example, at 20 kHz, the ripple that appears on the output side becomes double at 40 kHz. That is, the ripple frequency becomes double, and an advantageous secondary effect where electrolytic capacitor loss is reduced, is obtained.

In general, the core materials become better for handling high frequency in the order of: silicon steel (Fe base) core→amorphous core→ferrite core. In the present invention, the frequency of the current flowing in the coil becomes double than that of the conventional converter, it is possible to use the ferrite core, which is capable of handling high frequency, so that it becomes possible to realize further lightening of the core portion.

The feature of DC/DC converter according to the present invention is that the first switch and the second switch are IGBTs.

As described above, in the present invention, in contrast that the frequency of the current flowing in the coil becomes higher, the switching frequency can be maintained at a low frequency as that of the conventional converter. As a result, the present invention exhibits effects that it becomes possible to adopt ICBT in the circuit of the present invention, and that the DC/DC converter of the present invention is capable of corresponding to high frequencies and is durable to the high voltage. It is noted that a MOS transistor or a bipolar transistors may be used for the switch in the present DC/Dc converter.

Furthermore, the feature of the DC/DC converter of the present invention is that the DC/DC converter is connected to the output side of the first coil, and when the first switch is turned OFF, the first coil is used to flow an output current of the first coil to a positive electrode side of the output section, and a second diode that is connected to an output side of the second coil, and that is used to flow an electric current from the second coil to a positive electrode side of the output section, when the second switch is turned OFF.

According to such a construction, a step-up operation can be performed with the first diode (for example, the diode D1 shown in FIG. 1) and the second diode (for example, the diode D2 shown in FIG. 1), without the occurrence of unwanted cyclic current between the first coil (for example, the coil L1 shown in FIG. 1) and the second coil (for example, the coil L1 shown in FIG. 1).

Also, the DC/DC converter of the present invention comprising a third switch provided between an output side of a first coil and a positive electrode side of an output section, and a fourth switch provided between an output side of a second coil and a positive electrode side of an output section, and by turning the third and fourth switches alternately ON and OFF while maintaining the first and second switches always OFF, regeneration of electric power from the output section to an input section can be performed.

According to such a construction, in FIG. 3 for example, by newly providing a switch SW3 as a third switch between the output side of the coil L1, which is the first coil, and the positive electrode side of the output section, that is, the anode of the diode D1, and providing a switch SW4 as a fourth switch between the output side of the coil L2, which is the second coil, and the positive electrode side of the output section, that is, the anode of the diode D2, and by turning the switches SW3 and SW4 alternately ON and OFF, while maintaining the first and second switches SW1 and SW2 always OFF, it becomes possible operate a regeneration mode that regenerates electric power from the output section to the input section.

A computer program of the present invention is a program for executing a process for controlling a first switch and a second switch to alternately turn ON and OFF at a predetermined duty ratio, on a computer in a control section in a DC/DC converter provided with: a DC power supply input section, a coil section connected to a positive electrode side of the DC power supply input section, and an output section that outputs voltage stepped up by an output electric current from the coil section, wherein the coil section has; a core, and a first and a second coil having the same number of turns and wound in mutually opposite directions on the core, and there is provided; a first switch that is connected to an output side of the first coil and to a negative electrode side of the DC power supply input section, and that controls electric power to the first coil, and a second switch that is connected to an output side of the second coil and to a negative electrode side of the DC power supply input section, and that controls electric power to the second coil, and the control section that controls the first switch and the second switch to alternately turn ON and OFF.

In the DC/DC converter of the present invention, a coil section in which a first coil and a second coil are wound so as to offset magnetism is used, and at the same time as when an electric current is flowed in the first coil, an electric current is generated in the second coil in a direction to offset the magnetization of the core, and the electric current from the second coil is transferred to the output side. Similarly, at the same time as an electric current is flowed in the second coil, an electric current is generated in the first coil in a direction to offset the magnetization of the core, and the electric current from the second coil is transferred to the output side.

As a result, since the directions of the electric current in the windings are mutually opposite, direct current magnetization of the iron core is offset, so that even with a core smaller than that for the conventional technology, a larger amount of power can be handled. That is to say, miniaturization of the DC/DC converter becomes possible.

Also, with the DC/DC converter of the present invention, by a simple circuit construction, a step-up circuit that easily generates approximately double voltage can be provided. Furthermore, since the same voltage value is simply superposed on the power supply voltage, a voltage approximately double the input voltage can be maintained without using a special control. The switching duty ratios are respectively almost 50%, and need only to be fixed at the largest possible value where abnormal electric current does not flow.

Moreover, when each switch is driven, for example, at 20 kHz, the ripple that appears on the output side becomes double at 40 kHz. That is, the ripple frequency becomes double, and an effect where the ripple current can be reduced, and the loss of the electrolytic capacitor can be reduced, is obtained.

Also, the present invention allows not only miniaturization and lightening of the coil and the circuit because magnetic saturation of the coil core becomes difficult, but since the frequency of the electric current flowing in the coil is doubled, it also allows the use of material for high frequency for the core material, enabling further miniaturization and lightening. In general, cores become better capable of handling high frequency in the order of: silicon steel (Fc base) core→amorphous core→ferrite core. However, the present invention allows using ferrite, which handles high frequency, as a core material. This is because high frequency can be obtained in the magnetically coupled core section. This leads to lightening the core section. On the other hand, individual switching frequencies may be conventional frequencies. As a result, in the present invention, an IGBT which does not handle high frequencies well, can be used as a switch, and an effect where large electric current can be handled and resistance to high voltage is possible, can be achieved.

DETAILED DESCRIPTION OF THE INVENTION

Next, a best mode for carrying out the invention is described with reference to the drawings.

Figure 1:
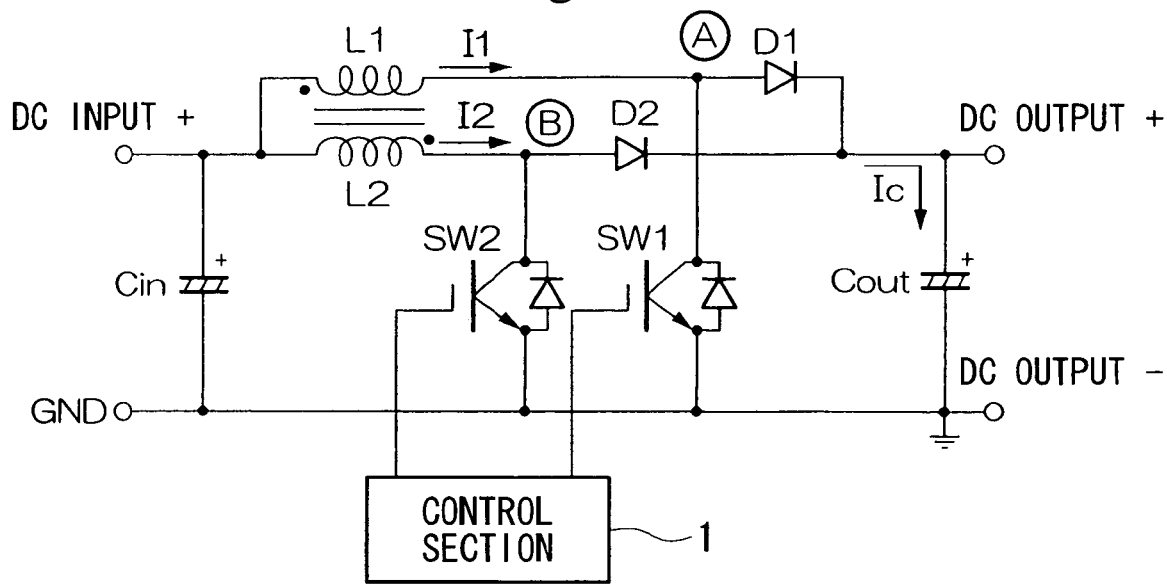
FIG. 1 is a basic circuit diagram of a step-up DC/DC converter according to the present invention.
Figure 2:
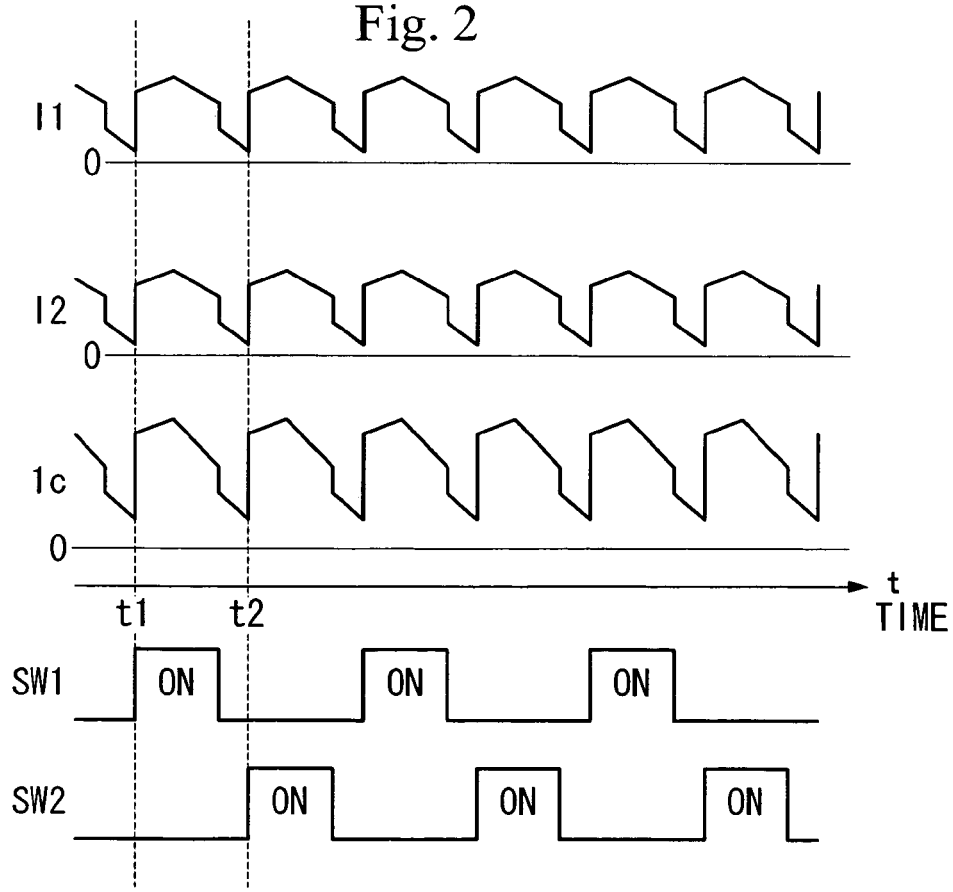
FIG. 2 is a waveform chart of the circuit shown in FIG. 1.

FIG. 1 is a basic circuit diagram of a voltage step-up DC/DC converter (also referred to simply as a "DC/DC converter") according to the present invention. Also, FIG. 2 is a timing chart that shows time variances of electric currents I1, I2 and Ic in the circuit of FIG. 1.

As shown in FIG. 1, the DC/DC converter circuit according to the present invention comprises: two coils L1 and L2 wound on one core; switches SW1 and SW2; two diodes D1 and D2 for rectification; a smoothing capacitor Cin on the input side; a smoothing capacitor Cout on the output side; and a control section 1 that controls the switches SW1 and SW2 to turn ON and OFF. In the present examples, the turns ratios of the two coils L1 and L2 is 1:1 and they are wound in opposite directions (reversed phases).

Moreover, the control section 1 has a function that controls the switches SW1 and SW2 to turn ON and OFF. This control section 1 may be realized with a dedicated hardware, or the same function may be realized by providing a computer system, such as a memory and a CPU in the control section 1, and loading a program (not shown in the drawings) for realizing the function of the control section 1, into the memory and executing the program.

Hereunder, the operation of the circuit of FIG. 1 is described with reference to FIG. 2.

When the switch SW1 is turned ON at time t1 (see FIG. 2), the potential of point A (FIG. 1) is reduced to the GND (0V) level. Moreover the input potential (10V for example) is applied to the coil L1 (upper winding), and an electric current I1 flows.

At this time, since windings of the coil L1 (upper winding) and the coil L2 (lower winding) are magnetically coupled (functions as a transformer), and the turns ratio of the windings is 1:1, 10V is induced in the coil L2 as with the coil L1. Also, the potential on the side of the winding of the coil L2 where a dot is marked, that is, a point B, becomes higher than that on the upstream side of the coil L2 (power supply side), due to the phase relation of the winding.

That is to say, since the input side of the coil L2 is connected to the + side of the power supply, the voltage induced in the coil L2 is added to and increases the input power supply voltage. As a result, the potential of the point B becomes approximately 20V, and while the switch SW1 is ON, an electric current I2 of the coil L2 is output to the output side as the electric current Ic via the diode D2.

In this way, at the same time as when the switch SW1 is turned ON and the electric current I1 flows into the coil L1 (upper winding), an electric current I2 is generated in the coil L2 (lower winding) in a direction in which the magnetization of the iron core is offset, and the electric current from the coil L2 is transferred to the output side.

On the other hand, when the switch SW1 is turned OFF, and instead the switch SW2 is turned ON at time t2, in exactly the same way as the operation described above, a voltage that is approximately twice the input voltage is generated in the coil L1 (upper winding), and the electric current I1 from the coil L1 is output to the output side as electric current Ic via the diode D1.

By repeating these operations, a voltage that is approximately twice the input (to be precise, it is slightly below twice since there is an approximately 1 to 2V voltage drop due to a forward voltage drop of the diode on the output side, and losses due to winding resistance of the coil and the like), is continuously output.

Here, if by chance the switch SW1 and the switch SW2 are turned ON at the same time, the inductance of the two windings is lost, and each winding becomes substantially short circuited. Therefore, the switch SW1 and the switch SW2 must not be turned ON at the same time. That is to say, the maximum ON duty of each switch SW1 and SW2 needs to be less than 50% (since switches in reality are not ideal and ON and OFF requires a finite transition time, an actual upper limit of the duty becomes approximately 45%, for example). This duty ratio is set according to the characteristics of the coils L1 and L2, the switches SW1 and SW2, and the capacitors Cin and Cout, so that the circuit carries out the step-up operation most efficiently.

Thus, the DC/DC converter of the present invention is characterized in that two of the coils L1 and L2 are wound on a single core, and by making the electric current flow in each winding in opposite directions, a magnetic coupling is formed, and direct current magnetization of the iron core being the core, is offset. Moreover, by providing two coils, the peak electric current of each coil decreases. This increases the tolerance to magnetic saturation, and greatly contributes to miniaturization of the coil. Moreover, by flowing electric current in one of the coils, a voltage is generated in the coil on the opposite side due to the transformer effect, and hence an electric current also flows in the other coil. As a result, switching is carried out at double the frequency. As a result, in the present application, for example ferrite, which is light-weight and has low magnetic loss, can be used for the core. Furthermore, since the coil on the opposite side absorbs the magnetic flux of the core, magnetic saturation is unlikely, and miniaturization of the core becomes possible.

FIRST EXAMPLE

Figure 3:
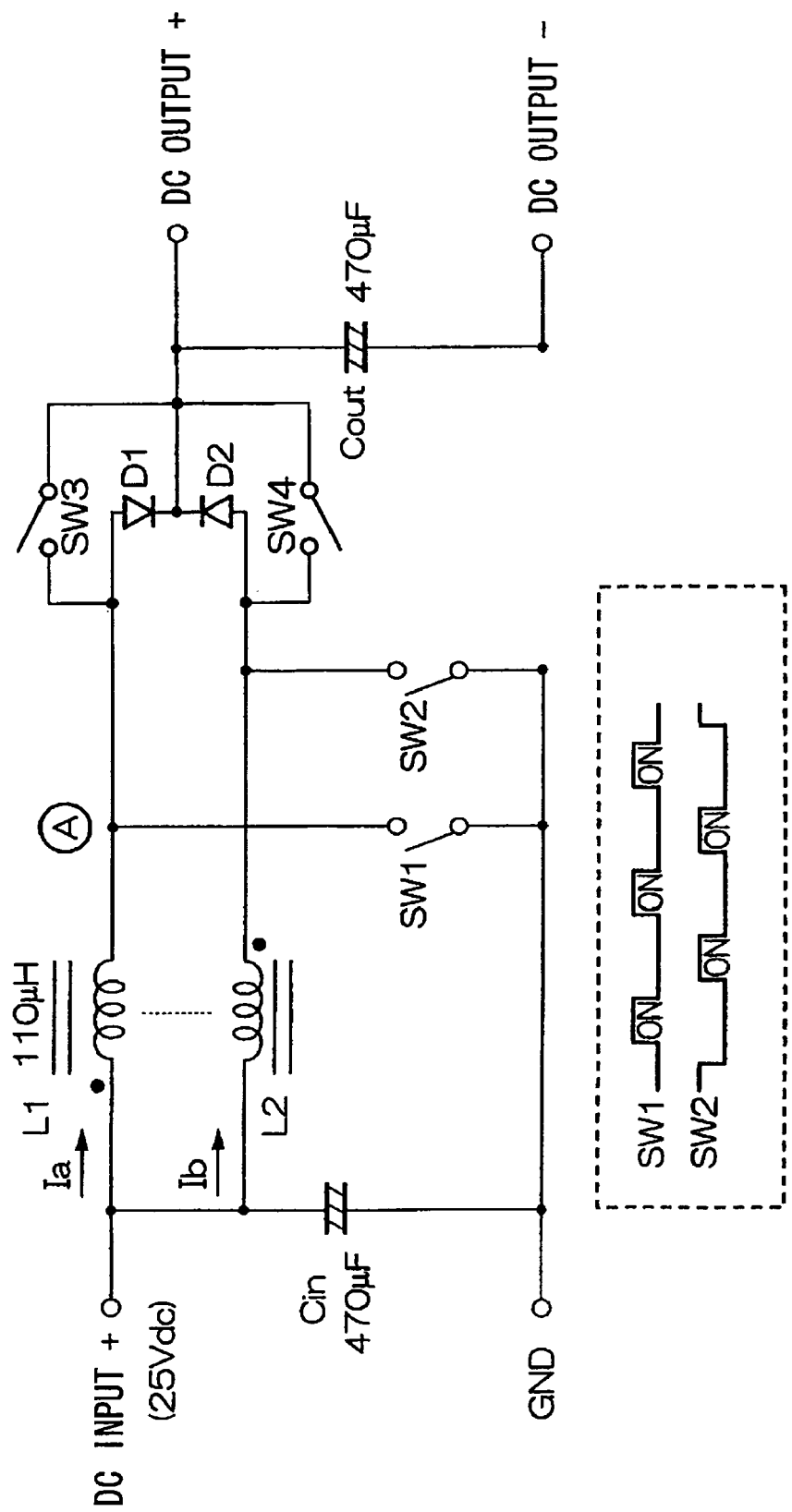
FIG. 3 is a diagram showing a first example of a step-up DC/DC converter according to the present invention.

FIG. 3 is a diagram showing a first example of a step-up DC/DC converter according to the present invention. In the circuit shown in FIG. 3, the capacitance of a capacitor Cin on the input side and a capacitor Cout on the output side is 470 µF, the inductance of coils L1 and L2 is 110 µH, and the switching frequency of switches SW1 and SW2 is 20 kHz.

Figure 4:
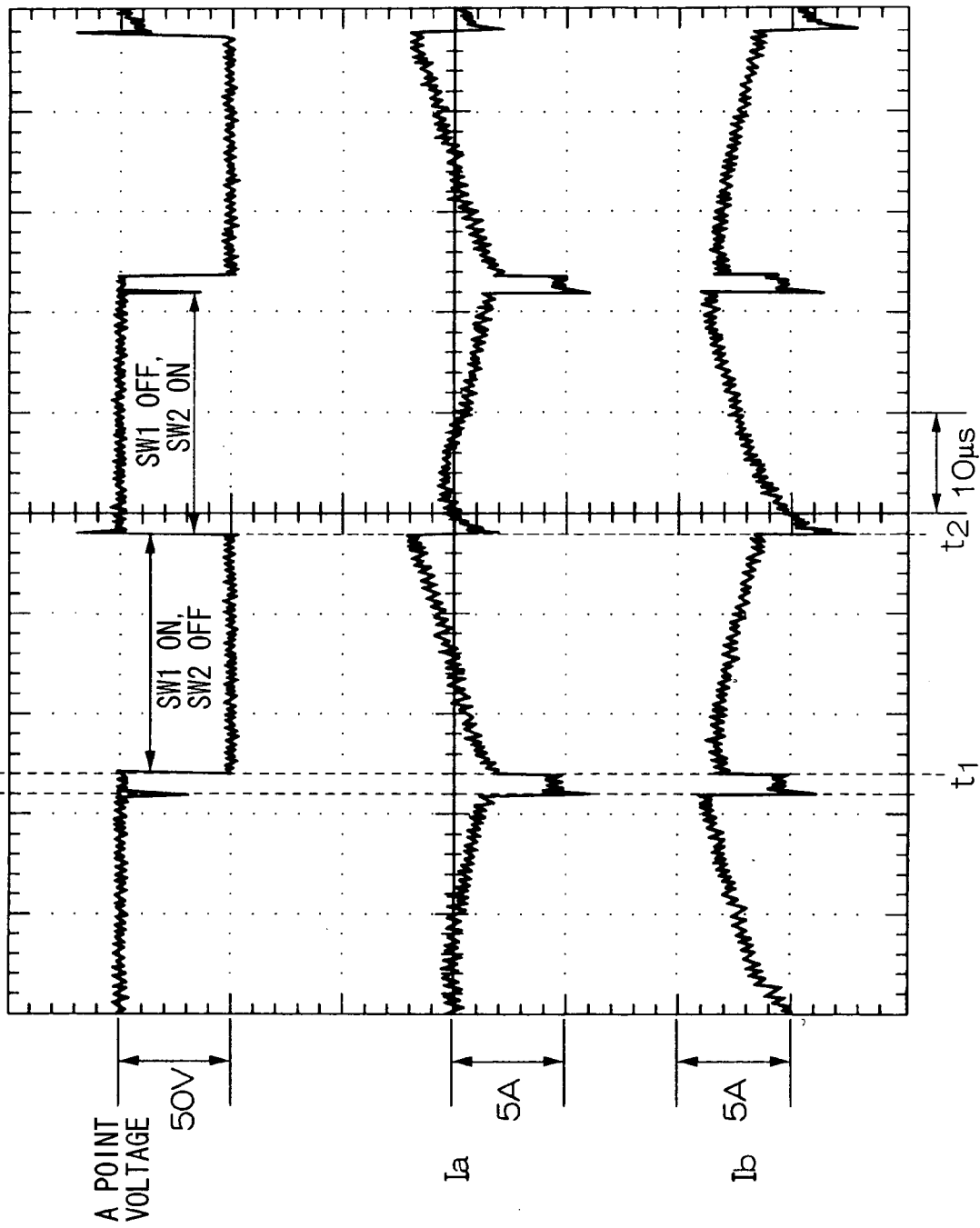
FIG. 4 is a waveform chart measured for the circuit shown in FIG. 3.

FIG. 4 is a waveform chart measured by the circuit shown in FIG. 3, being a waveform chart obtained when operating the circuit of FIG. 3 with an input voltage of 25V, an output voltage of a little less than 50V (actually around 47.5V), and at 150 W.

FIG. 4 shows, in order from the top, time variances of the voltage at point A (FIG. 3) (voltage on the output side of the coil L1), Ia (electric current flowing in the coil L1), and Ib (electric current flowing in the coil L2).

When at time t1, the switch SW1 is turned ON and the switch SW2 is turned OFF, the potential at point A is reduced to the GND (0V) level. Moreover an input potential (10V for example) is applied to the coil L1 (upper winding), and an electric current Ia flows. At this time, the windings of the coil L1 (upper winding) and the coil L2 (lower winding) are magnetically coupled (functions as a transformer), and an electric current Ib flows.

Moreover, when at time t2, the switch SW1 is turned OFF and the switch SW2 is turned ON, an input voltage (for example, 10V) is applied to the coil L2 (lower winding), and an electric current Ib flows.

At this time, the windings of the coil L2 (lower winding) and the coil L1 (upper winding) are magnetically coupled (functions as a transformer), and an electric current Ia flows.

SECOND EXAMPLE

Figure 5:
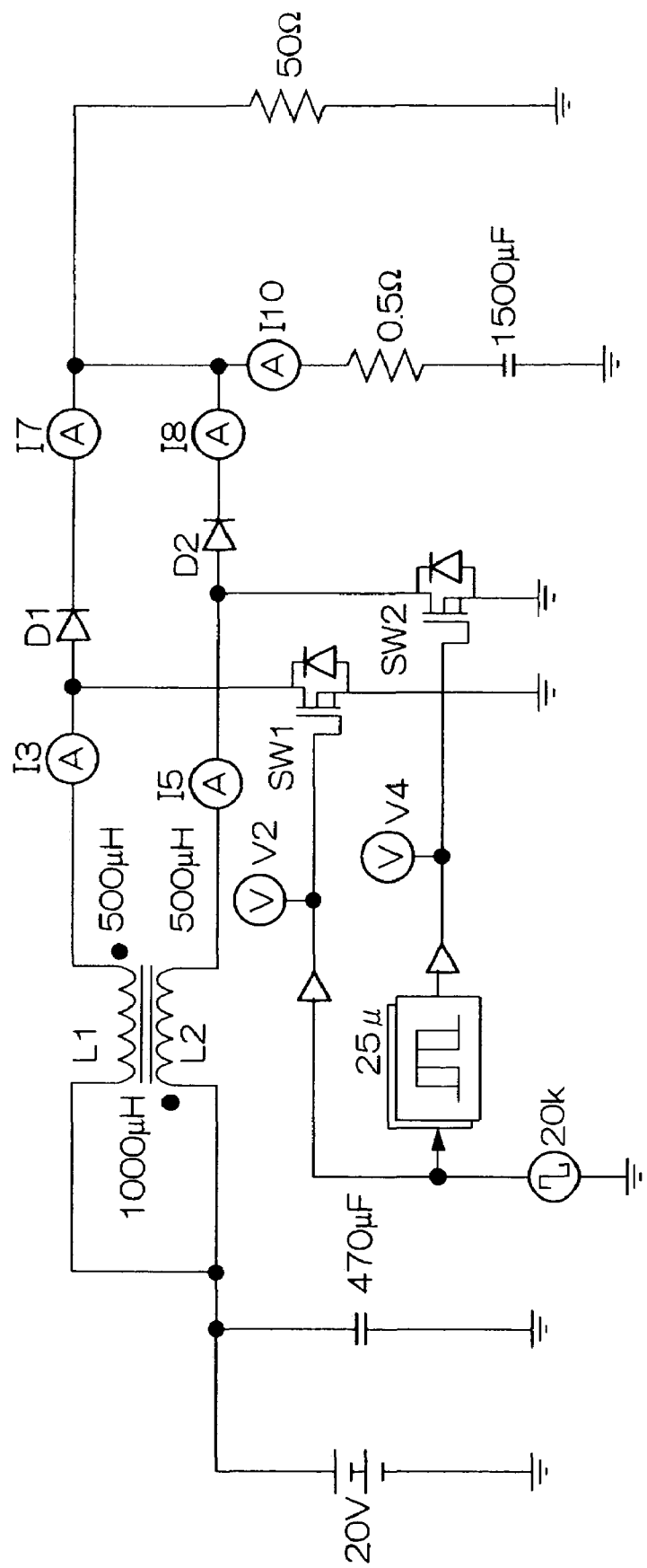
FIG. 5 is a diagram showing a second example of a step-up DC/DC converter according to the present invention.

FIG. 5 is a diagram showing, a second example of a DC/DC converter according to the present invention. In the example shown in FIG. 5, the capacitance of a capacitor Cin on the input side is 470 µF, the capacitance of a capacitor Cout on the output side as 1500 µF, the inductance of coils L1 and L2 is 550 µH (mutual inductance is 1000 µH), a load resistance is 50Ω, and switches SW1 and SW2 are constructed with FET transistors. The input power supply voltage is 20V, and the switching frequency of the switches SW1 and SW2 is 20 kHz.

Figure 6:
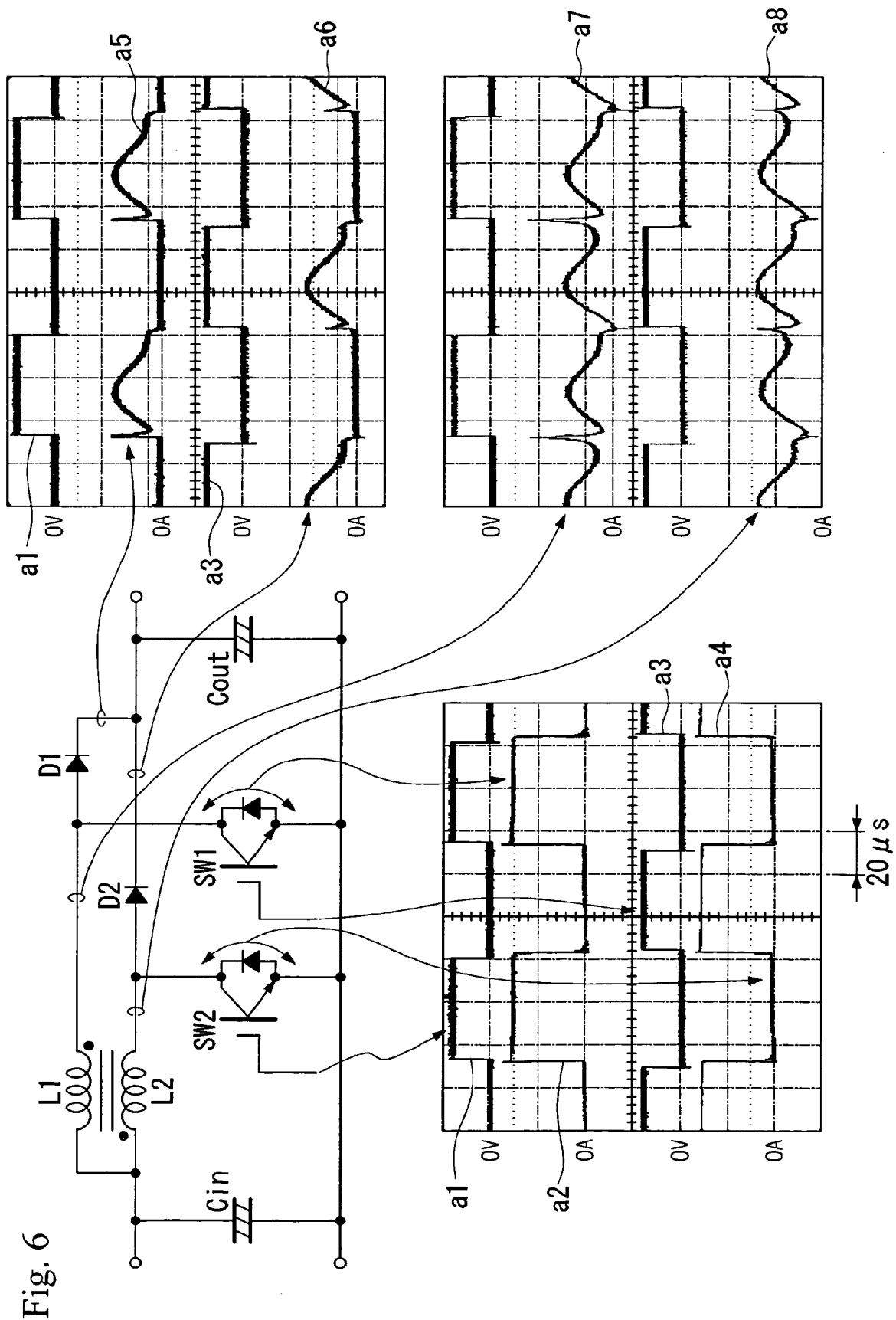
FIG. 6 is a diagram showing waveform measurement examples for each part of an actual circuit.
Figure 7:
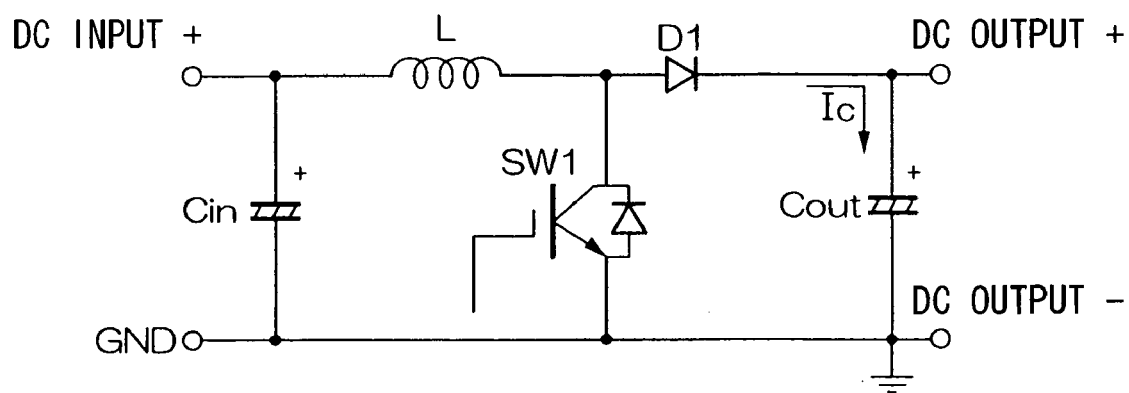
FIG. 7 is diagram showing an example of a conventional step-up DC/DC converter.
Figure 8:
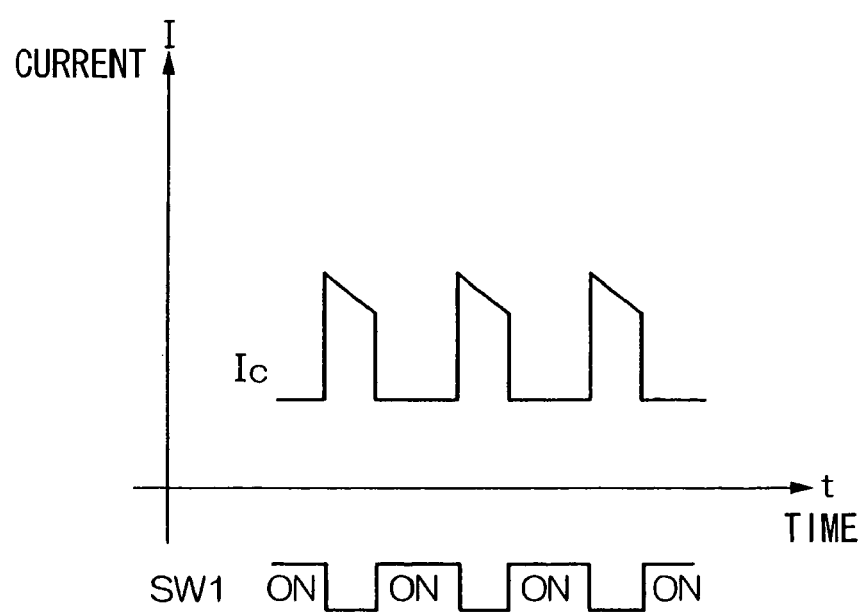
FIG. 8 is a timing chart showing time variance in an output electric current Ic in the circuit of FIG. 7.
Figure 9:
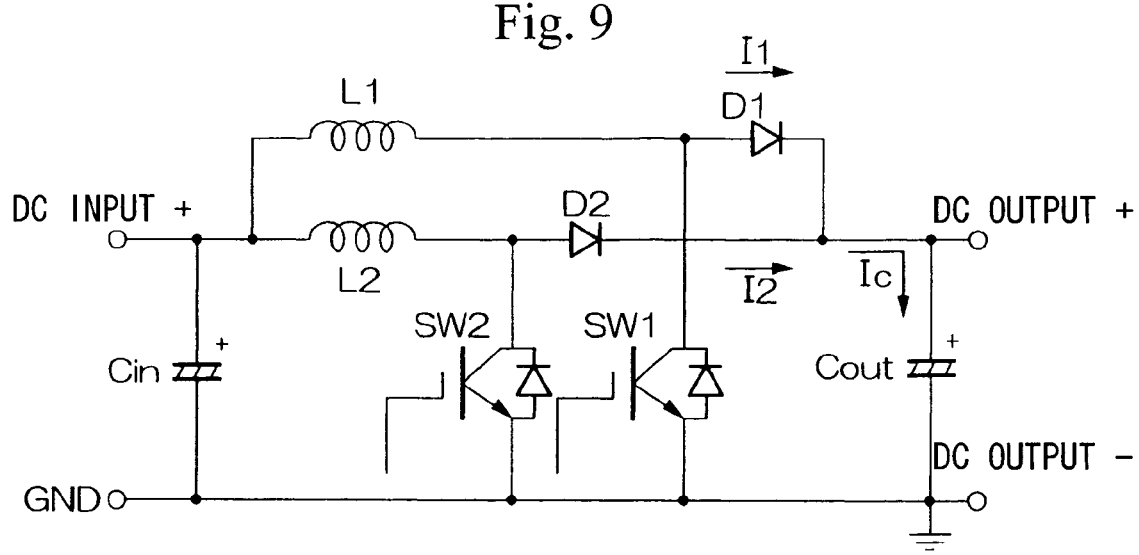
FIG. 9 is diagram showing another example of a conventional step-up DC/DC converter.
Figure 10:
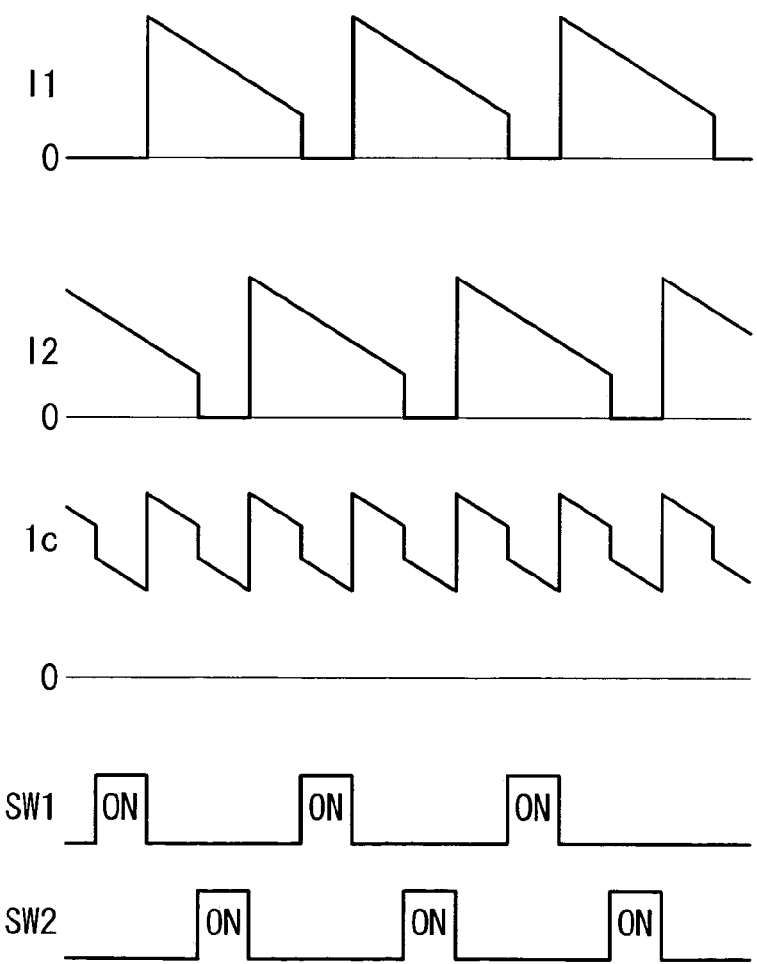
FIG. 10 is a timing chart showing time variance in output electric current at each part of the circuit of FIG. 9.

Moreover, FIG. 6 is a diagram showing waveform measurement examples of each part of an actual circuit that uses the present invention, and shows waveforms when the input voltage is 150V, the output voltage is 297V, and the output is 3.37 kW.

In FIG. 6, reference symbol a1 denotes waveforms of a gate for turning the switch SW2 ON and OFF, reference symbol a2 denotes waveforms of voltage that is applied to the switch SW1, reference symbol a3 denotes waveforms of a gate for turning the switch SW1 ON and OFF, reference symbol a4 denotes waveforms of voltage that is applied to the switch SW2, reference symbol a5 denotes waveforms of electric current flowing from a diode D1, reference symbol a6 denotes waveforms of electric current flowing from a diode D2, reference symbol a7 denotes waveforms of electric current flowing from the coil L1, and reference symbol a8 denotes waveforms of electric current flowing from the coil L2.

In FIG. 3, by newly providing a switch SW3 as a third switch between the output side of the coil L1, which is the first coil, and the positive electrode side of the output section, that is, the anode of the diode D1, and providing a switch SW4 as a fourth switch between the output side of the coil L2, which is the second coil, and the positive electrode side of the output section, that is, the anode of the diode D2, and by turning the switches SW3 and SW4 alternately ON and OFF while maintaining the first and second switches SW1 and SW2 always OFF, it becomes possible operate a regeneration mode that regenerates electric power from the output section to the input section.

This regeneration mode is used, for example, in the case where the motor is used as the output side load and the rotation speed is controlled in a deceleration control (regenerative braking operation), and the voltage on the output (load) side is increased, the voltage of the output (load) is decreased (for returning energy to the input side) such the output (load) side voltage becomes twice as much as the voltage on the input (power supply) side (regeneration braking operation and the like) for charging an input side power supply such a battery.

The present invention enables realization of miniaturization and lightening of the coil section and the DC/DC converter. Therefore, the present invention can be applied to various circuits that perform voltage conversion of direct current electricity. For example, it can be used in applications such as an input side circuit of a inverter for increasing a voltage of a solar cell which generates electricity from sunlight to the general voltage used in the system voltage level, and as similarly as a input side circuit of a inverter for inputting electricity generated by a FC (fuel cell) and wind-power, a circuit for increasing the voltage for driving a motor in an automatic hybrid system, a system that uses a load requiring a voltage higher than that of a common battery voltage; and a usage for movable bodies such as automobiles, or for electrical household machinery and equipment for which the installation space is narrow.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A DC/DC converter comprising:
   a DC power supply input section;
   a coil section connected to a positive electrode side of said DC power supply input section, the coil section comprising a core, and a first coil and a second coil wound around said core in opposite wound directions, the turns ratio of said first and second coils being 1:1, so as to offset a magnetic field in which a magnetic field generated by a first input voltage supplied to said first coil causes said second coil to generate a first induced voltage substantially the same as said first input voltage to offset the magnetization of the core and a magnetic field generated by a second input voltage supplied to said second coil causes said first coil to generate a second induced voltage substantially the same as said second input voltage to offset the magnetization of the core;
   an output section that outputs voltage stepped up by an output electric current from said coil section;
   a first switch that is connected to an output side of said first coil and to a negative electrode side of said DC power supply input section, and that controls electric power to said first coil;
   a second switch that is connected to an output side of said second coil and to a negative electrode side of said DC power supply input section, and that controls electric power to said second coil; and
   a control section that controls said first switch and said second switch to alternately turn ON and OFF.

2. A DC/DC converter according to claim 1, wherein said first switch and said second switch are IGBTs.

3. A DC/DC converter according to claim 1 comprising;
   a first diode provided between an output side of said first coil, and a positive electrode side of said output section, and
   a second diode provided between an output side of said second coil, and a positive electrode side of said output section.

4. A DC/DC converter according to claim 1 comprising:
   a third switch provided between an output side of the first coil and a positive electrode side of an output section; and
   a fourth switch provided between an output side of the second coil and a positive electrode side of the output section,
   and by turning said third and fourth switches alternately ON and OFF while maintaining said first and second switches always OFF, regeneration of electric power from the output section to the input section can be performed.

5. A recording medium including a computer readable program for executing on a computer for outputting a voltage stepped up by controlling a first switch and a second switch to alternately turn ON and OFF at a predetermined duty ratio in a control section in a DC/DC converter, comprising a DC power supply input section, a coil section connected to a positive electrode side of said DC power supply input section, and an output section that outputs a voltage stepped up by an output electric current from said coil section,
   wherein and said coil section comprising a core, and a first coil and a second coil having the same number of turns and wound in mutually opposite directions on said core, and a first switch that is connected to an output side of said first coil and to a negative electrode side of said DC power supply input section, and that controls electric power to said first coil, and a second switch that is connected to an output side of said second coil and to a negative electrode side of said DC power supply input section, and that controls electric power to said second coil, and the program comprising the steps of:
   switching the first switch ON and the second switch OFF for flowing an excitation current in the first coil and generating an electric current in the second coil in a direction to offset the magnetization of the core in which a magnetic field generated by a first input voltage supplied to said first coil causes said second coil to generate a first induced voltage substantially the same as said first input voltage, and the electric current from the second coil is transferred to an output side capacitor; and
   switching the second switch ON and the first switch OFF for flowing an excitation current and generating an electric current in the first coil in a direction to offset the magnetization of the core in which a magnetic field generated by a second input voltage supplied to said second coil causes said first coil to generate a second induced voltage substantially the same as said second input voltage, and the electric current from the first coil is transferred to the output side capacitor.

* * * * *